United States Patent [19]

Kato et al.

[11] Patent Number: 4,971,826
[45] Date of Patent: * Nov. 20, 1990

[54] PROCESS FOR PRODUCING ROLLED-IN TYPE EMULSIFIED FAT AND OIL COMPOSITION

[75] Inventors: Masaaki Kato; Katumi Shinohara; Hiromu Sugiyama, all of Tokyo, Japan

[73] Assignee: Asahi Denka Kogyo Kabushiki Kaisha, Tokyo, Japan

[*] Notice: The portion of the term of this patent subsequent to Aug. 29, 2006 has been disclaimed.

[21] Appl. No.: 300,794

[22] Filed: Jan. 23, 1989

[30] Foreign Application Priority Data

Feb. 5, 1988 [JP] Japan .................................. 63-26201

[51] Int. Cl.$^5$ .............................................. A23L 1/035
[52] U.S. Cl. ..................................... 426/602; 426/604
[58] Field of Search ................................. 426/602, 604

[56] References Cited

U.S. PATENT DOCUMENTS

| | | | |
|---|---|---|---|
| 4,178,393 | 12/1979 | Gregerson | 426/601 |
| 4,684,533 | 8/1987 | Kratochvil | 426/602 |
| 4,861,610 | 8/1989 | Kato et al. | 426/602 |

FOREIGN PATENT DOCUMENTS 0063906  5/1977  Japan .................................. 426/602

*Primary Examiner*—Donald E. Czaja
*Assistant Examiner*—Helen Pratt
*Attorney, Agent, or Firm*—Frishauf, Holtz, Goodman & Woodward

[57] ABSTRACT

A process for producing a rolled-in type emulsified fat and oil composition by emulsifying 2 to 20% by weight of protein, 30 to 75% by weight of fat and oil and 18 to 65% by weight of water into an oil-in-water type emulsion, which comprises adding 0.1 to 5% by weight, based on the fat and oil, of phospholipid which comprises mono acyl glycero phospholipid at least 40% by weight based on the total phospholipid and at least one emulsifier component to thereby provide the necessary oil-in-water type emulsion.

22 Claims, No Drawings

PROCESS FOR PRODUCING ROLLED-IN TYPE EMULSIFIED FAT AND OIL COMPOSITION

BACKGROUND OF THE INVENTION

1. Field of the Invention:

This invention relates to a process for producing a rolled-in type emulsified fat and oil composition. More particularly, it relates to a process for producing a stable rolled-in type emulsified fat and oil composition improved in puffing properties and nutritional value.

2. Description of the Prior Art:

A rolled-in type emulsified fat and oil composition to be used in, for example, puff pastry, danish pastry or croissant would form thin layers in a dough, through repeated folding and rolling, to thereby impart a large volume and a crispy texture to the final baked product. When no thin layer structure can be adequately formed, neither the desired volume nor the crispy texture can be achieved. In order to form the aimed thin layers, a rolled-in type emulsified fat and oil composition should have an appropriate consistency, elasticity and flexibility suitable for each dough. Rolled-in type emulsified fat and oil compositions may be broadly classified into a water-in oil type emulsified composition including margarine and an oil-in-water type one. Since the former has a continuous phase comprising a fat and oil, it shows a large change in consistency depending on temperature. Thus it is required to produce such products with the use of a specific device, for example, a complecter or a high-pressure combinater or to employ such a fat and oil composition as to cause a smaller SFI change depending on temperature in order to widen the application temperature range thereof, though the latter method brings about a poor meltability in the mouth. On the other hand, since the latter has a continuous phase comprising water, it shows less change in consistency depending on temperature and thus has a wide application temperature range. However it is required to incorporate a fat and oil thereinto at a high content in order to give a consistency suitable for a dough. It is further required to add a thickener to the aqueous phase thereof. Furthermore it is required at present to add a preservative thereto to thereby improve the shelf stability. With the recent concern for health, the consumption of fat-rich products such as puff pastry, danish pastry and croissant has been stagnant. In order to counteract these situations, it is required to lower the fat and oil composition content of a product or the fat content of a rolled-in type emulsified fat composition. However every known process therefor is accompanied by some troubles such as failure to form the necessary layer structure, an undesirable texture or a poor volume.

As an example of an oil-in-water type emulsified composition containing protein. U.S. Pat. No. 4,012,533 discloses a whipped cream dessert comprising 10 to 32% of a fat and 1.5 to 7% of a composition of a water-soluble protein, a sweetener, an emulsifier and a gum stabilizer, while Japanese Patent Laid-Open No. 79849/1982 discloses an oil-in water type emulsified composition wherein a partially hydrolyzed soybean protein is used as an emulsifier. However, the former product is one produced by dissolving the small amount of water-soluble protein in a large amount of water, emulsifying the resulting solution with the use of the emulsifier and stabilizer and then whipping the obtained emulsion, and the latter one is one emulsified by using the partially hydrolyzed soybean protein of an improved emulsifying capability. Thus both of these prior products are different from the rolled-in type emulsified fat composition of the present invention wherein a common protein is employed at a high content in an oil-in-water type emulsified composition. It is usually very difficult to stably emulsify a composition of a high protein content. In the case of a kneaded-in or folded-in type oil-in-water type emulsified composition comprising a fat, a starch, water and a gum disclosed in Japanese Patent Laid-Open No. 166345/1986, for example, stabilizers, namely, the starch and gum are added. However the product thus obtained has a gelationous and poor texture. When it is to be rolled in, in addition, it is liable to adhere to the dough to thereby form no layer.

SUMMARY OF THE INVENTION

It is an object of the present invention to provide a process for producing a rolled-in type emulsified fat and oil composition of a low fat and oil content which is capable of giving an excellent layer structure as well as a desirable volume.

As the result of extensive studies, the present inventors have found that the above object can be achieved by emulsifying fat and oil at a high protein content with the use of a specific emulsifier to thereby give an oil-in-water type emulsion.

The present invention has been completed based on the above finding and provides a process for producing a rolled-in type emulsified fat and oil composition comprising emulsifying a composition of 2 to 20% by weight of protein, 30 to 75% by weight of fat and oil and 18 to 65% by weight of water to thereby give an oil-in-water type emulsion, wherein 0.1 to 5% by weight of phospholipid which comprise mono acyl glycero phospholipid at least 40% by weight based on the total phospholipid are added as at least one emulsifying component.

The process of the present invention enables the production of a rolled-in type emulsified fat and oil composition which contains less fat and oil and yet has a comparable, or even superior, volume and texture, when compared with conventional ones. The process for producing the rolled-in type emulsified fat and oil composition of the present invention is further advantageous in that it enables a large amount of protein, which would exert undesirable effects on the fermentation or flexibility of a dough, to be incorporated into a baked product to thereby elevate the nutritional value thereof.

According to the process of the present invention, it is also possible to sustain a stable emulsion after ultrahigh-temperature flash pasteurization or in the presence of edible sodium chloride which improves the shelf stability of the product.

DETAILED DESCRIPTION OF THE INVENTION

The protein to be used in the present invention may be either in a natural state, a salt such as a sodium salt or treated with protease, so long as it originates from an edible material such as milk, soybean or egg albumen. It may be used in an amount of 2 to 20% by weight, preferably 7 to 15% by weight, based on the emulsified fat and oil composition. A low protein content may be employed when the fat and oil content is high while the water content is low. However a protein content less than 2% cannot give the necessary effects. The amount of the protein to be used would increase with a decrease in fat and oil content and with an increase in water content. When the fat and oil content is 30% by weight or above, a stable emulsion can be hardly obtained by using 20% by weight or more of protein.

When a hardly soluble protein, such as natural casein, is selected as the protein, it is preferable to add 0.5 to 15% by weight, based on the protein, of molten salt(s) such as sodium citrate, sodium tetrapolyphosphate or sodium tripolyphosphate thereto.

Any animal or vegetable fat and oil may be employed in the present invention without restriction, so long as it is a common edible fat and oil. Examples thereof include palm oil, beef tallow, coconut oil, corn oil, rapeseed oil and milk fat which are optionally hardened and/or fractionated. In order to give an excellent meltability in the mouth, it is preferable to combine these fats and oils together in such a manner as to give an elevated melting point of 30° to 37° C. In order to fully achieve the effects of the present invention, it is preferable to employ fat and oil in as small an amount as possible. However no satisfactory rolling-in properties can be obtained unless at least 30% by weight of fat and oil is used. On the other hand, a fat and oil content exceeding 75% by weight would largely depart from the object of the present invention. Accordingly the rolled-in type emulsified fat and oil composition of the present invention may comprise fat and oil in an amount of 30 to 75% by weight, preferably 40 to 60% by weight. Any water may be used so long as it is potable. When the fat and oil content is 75% by weight or below, a water content of 18% by weight or below cannot give any stable emulsion. On the other hand, a water content exceeding 65% by weight would result in unsatisfactory rolling-in properties. Accordingly the rolled-in type emulsified fat and oil composition of the present invention may comprise 18 to 65% by weight, preferably 25 to 50% by weight, of water.

The fatty acid of the mono acyl glycero phospholipid(s) (i.e., lyso phosphatide(s)), used as the essential component of the emulsifier in the present invention, are preferably those having eight or more carbon atoms. In each mono acyl glycero phospholipid, the acyl group may be located in either $\alpha$- or $\beta$-position. As the mono acyl glycero phospholipid(s), both of natural ones of L-form and synthetic racemates may be used.

It is known that natural mono acyl glycero phospholipid(s) are present in living organisms together with diacyl glycero phospholipid(s) in, for example, lipids of cereals such as soybean, rapeseed, corn or wheat and of animal cells. Mono acyl glycero phospholipid(s) may be further produced by hydrolyzing diacyl glycero phospholipids present in animal lipids such as yolk or vegetable lipids such as soybean with phospholipase A-2 obtained from swine pancreatic juice or snake venoms or phospholipase A-1 obtained from bacteria; removing the fatty acids thus formed with, for example, acetone; and purifying the residue by, for example, silica gel chromatography, if required (cf. Japanese Patent Laid-Open Nos. 13263/1971, 136966/1977 and 51853/1983). In this case, the mono acyl glycero phospholipid(s) thus obtained may be hydrogenated in an appropriate solvent in the presence of a catalyst such as nickel to thereby give a surfactant of a higher oxidation stability.

It is described in J. Amer. Oil Chem. Soc., 886-888, Oct. 1981 that mono acyl glycero phospholipid(s) of various compositions can be obtained by changing the conditions under which the phospholipase A-2 is employed.

Alternately mono acyl glycero phospholipid(s) can be obtained from materials prepared by fractionating diacyl glycero phospholipids with the use of a solvent such as ethyl alcohol. Further methods for preparing phosphatidylcholine such as the one with the use of yolk (cf. J. Biol. Chem., 188, 471–476 (1951)) as well as those as described in Japanese Patent Publication Nos. 16/1985, 42655/1984, 123496/1982 and 23997/1981 can be appliml to the present invention. Every natural mono acyl glycero phospholipid as mentioned above has a levo-rotatory optical activity and is turned out to be safe when orally administered to animals (cf. J. Sci. Food and Agr., 32, 451–458).

The glycero phospholipid(s) to be used in the present invention can be analyzed by, for example, thin layer chromatography, TLC-FID analyser (Iatro Scan method) or high-performance liquid chromatography.

It is preferable that the mono acyl glycero phospholipid(s) to be used in the present invention, which can be obtained by the methods as described above, substantially comprise lyso phosphatidylcholine (i.e. mono acyl phosphatidylcholine). The mono acyl glycero phospholipid(s) may further contain lyso phosphatidylethanolamine and a small amount of one or more mono acyl glycero phospholipid(s) selected from among lyso phosphatidylinositol, lyso phosphatidic acid and lyso phosphatidylserine. The phospholipid(s) (a) which comprise mono acyl glycero phospholipid(s) (c) prepared from natural materials often contain diacyl phospholipid(s) (b) corresponding to the mono acyl glycero phospholipid(s) (c) depending on the employed preparation processes. In such a case, it is preferable that the content of the mono acyl glycero phospholipid(s) (c) is 40% by weight or above, preferably 50% by weight or above, based on the total phospholipids (a).

Phospholipid(s) which contain relatively large amount of mono acyl glycero phospholipid(s) may be used together with crude soybean phospholipid(s) containing oily component(s). In this case, it is preferable that the phospholipid(s) which contain mono acyl glycero phospholipid(s) are dispersed in an aqueous phase while the crude soybean phospholipids are dispersed in an oily phase.

As described above, the emulsifier(s) to be used in the present invention comprise phospholipid(s) which contain mono acyl glycero phospholipid(s) as an essential component. Preferable examples of emulsifiers to be used therewith include polyglycerol fatty acid esters, sucrose fatty acid esters, sorbitol fatty acid esters and glycerol fatty acid monoesters. With the use of these esters, the objects of the present invention can be achieved at a relatively low cost.

Examples of the polyglycerol fatty acid esters to be preferably used in the present invention together with said phospholipid(s) are mono-, di- or polyesters of polyglycerols having a degree of polymerization of 4 to 10 with saturated and/or unsaturated fatty acids having 14 to 22 carbon atoms and mixtures thereof. Polyglycerol fatty acid esters of fatty acids having 13 or less carbon atoms would exhibit a bitter taste, while those of fatty acids having 23 or more carbon atoms are hardly available in general.

Examples of the sucrose fatty acid esters to be preferably used in the present invention together with said phospholipid(s) are mono-, di- or polyesters of sucrose with saturated and/or unsaturated fatty acids having 12 to 22 carbon atoms and mixtures thereof. Sucrose fatty acid esters of fatty acids having 11 or less carbon atoms would exhibit only limited emulsifying effects, while those of fatty acids having 23 or more carbon atoms are hardly available in general.

Examples of the sorbitol fatty acid esters to be preferably used in the present invention together with said phospholipid(s) are mono-, di- or polyesters or sorbitol, sorbitan or sorbide with saturated and/or unsaturated fatty acids having 12 to 22 carbon atoms and mixtures thereof. Sorbitol fatty acid esters of fatty acids having 11 or less carbon atoms would exhibit only limited emulsifying effects, while those of fatty acids having 23 or more carbon atoms are hardly available in general.

Examples of the glycerol fatty acid monoesters to be preferably used in the present invention together with said phospholipid(s) are monoesters of glycerol with saturated and/or unsaturated fatty acids having 12 to 22 carbon atoms and mixtures mainly comprising the monoesters together with a small amount of di- and/or triesters. Glycerol fatty acid monoesters of fatty acids having 11 or less carbon atoms would exhibit only limited emulsifying effects, while those of fatty acids having 23 or more carbon atoms are hardly available in general.

It is preferable that the emulsifier composition to be used in the present invention comprises said phospholipid(s) and polyglycerol fatty acid ester(s), sucrose fatty acid ester(s) or sorbitol fatty acid ester(s) in a weight ratio of 30:70 to 100:0; or said phospholipid(s) and glycerol fatty acid monoester(s) at a weight ratio of 50:50 to 100:0. When the amount of said phospholipid(s) is smaller, the effects of the present invention are not enough.

Said phospholipid(s) are used in an amount of 0.1 to 5% by weight based on the fat or oil. When they are less than 0.1% by weight, the effects of the present invention can not be achieved.

The addition of the same in an amount exceeding 5% by weight is disadvantageous from the economical viewpoint since it brings about no change in the effects and sometimes alters the taste.

Generally speaking, the required amount of said phospholipid(s) would decrease with an increase in the content of the mono acyl glycero phospholipid(s).

When the above emulsifier(s) are to be used together with said phospholipid(s), the total amount of the emulsifier mixture is 0.1 to 5% by weight based on the fat or oil. The addition of the same in an amount exceeding 5% by weight is disadvantageous from the economical viewpoint since it brings about no change in the effects and sometimes alters the taste.

In the process of the present invention, surfactants other than those cited above may be employed together as emulsifiers, without departing from the scope of the present invention.

By using the abovementioned phospholipid(s) as at least one emulsifying component, it becomes possible to obtain a stable emulsion even at a high protein content and to give a rolled-in type emulsified fat and oil composition of excellent rolling-in properties at a lower fat and oil content than conventional ones. Further the product thus obtained sustains stable emulsion even at a high temperature of 100° C. or above or in the presence of a large amount of edible sodium chloride. Thus the shelf stability thereof can be improved by subjecting the same to ultrahigh-temperature flash pasteurization or by employing a high edible sodium chloride concentration. Namely, the rolled-in type emulsified fat and oil composition of the present invention can contain 6 to 30% by weight of edible sodium chloride based on the total water content in the oil-in-water type emulsion.

The rolled-in type emulsified fat and oil composition of the present invention, which essentially comprises protein, fat and oil, water and mono acyl glycero phospholipid, may further contain additives such as perfumes, seasonings, spices, sugars and vitamins, in addition to the abovementioned edible sodium chloride, without departing from the scope of the present invention. Although starches, gums and preservatives may be added thereto, it is preferable not to use these materials from the viewpoint of the object of the present invention.

The rolled-in type emulsified fat and oil composition of the present invention may be produced in the following manner.

The phospholipid(s) which contain mono acyl glycero phospholipid(s) and the abovementioned compatible emulsifier(s), if required, are added to an aqueous phase or to fat(s) and oil(s) and dissolved or dispersed therein. It is preferable that hydrophilic emulsifier(s) are added to an aqueous phase while lipophilic one(s) are added to fat(s) and oil(s). Then protein(s), molten salt(s), edible sodium chloride and other additives, if required, are further added to the aqueous phase, which is then heated to 60° C. or above to thereby dissolve the protein(s) and other additives. Fat(s) and oil(s) are added to the aqueous phase and the resulting mixture is emulsified by stirring at a high rate in a homomixer, by using a pressurized homogenizer, by using a colloid mill, by ultrasonically treating or by combining some of these procedures to thereby give an oil-in-water type emulsion. The emulsion thus obtained may be used as a product as such. Alternatively it may be further subjected to ultrahigh-temperature flash pasteurization and then used as a product. The ultrahigh-temperature flash pasteurization may be preferably carried out by heating the oil-in-water type emulsion to 110° to 150° C. for two seconds to four minutes.

The emulsion thus pasteurized may be further homogenized under sterile conditions to thereby give a product. The sterile homogenization may be carried out by a conventional method.

To further illustrate the present invention, and not by way of limitation, the following Examples will be given.

In the following Examples, the term phospholipids means those mainly comprising mono acyl glycero phospholipid(s) and di acyl phospholipid(s).

EXAMPLE 1

Commercially available soybean phospholipids were subjected to precipitation with acetone and fractionation with aqueous ethanol to thereby give phospholipids comprising 70% of di acyl phosphatidylcholine. The phospholipids were treated with swine pancreatic phospholipase A-2 (Lecitase 10-L; mfd. by Novo Industri A/S). The fatty acids thus formed were removed with acetone and fractionated with an alcohol. After being further fractionated with a silicic acid column and an alcohol, phospholipids comprising 95% of lyso phosphatidylcholine and 2% of lyso phosphatidylethanolamine, i.e., total mono acyl glycero phospholipid content of 97%, was obtained.

0.5 kg of the phospholipids and 9.5 kg of egg albumen were added to 30 kg of water and dissolved therein by heating to 60° C. 6 kg of hardened palm oil having a melting point of 45° C., 15 kg of palm oil, 33 kg of hardened soybean oil having a melting point of 36° C. and 6 kg of refined soybean oil were added thereto and the obtained mixture was emulsified with a homomixer (mfd. by Tokushu Kika Kogyo Co., Ltd.) at 15,000 rpm and at 60° C. for ten minutes to thereby give an oil-in-water type emulsified fat and oil composition.

EXAMPLE 2

Defatted phospholipids were obtained by subjecting soybean phospholipids to precipitation with acetone. The defatted phospholipids were treated with Lecitase 10L and phospholipids were extracted therefrom with a mixture of isopropyl alcohol and hexane and treated with acetone to thereby defat the same. The defatted phospholipids were extracted with an alcohol to thereby give phospholipids rich in mono acyl glycero phospholipids. These phospholipids comprised 48% of lyso phosphatidylcholine and 11% of lyso phosphatidylethanolamine as the main components and showed a total mono acyl glycero phospholipid content of 62%.

0.6 kg of the phospholipids, 8 kg of casein, 0.3 kg of sodium citrate, 0.3 kg of sodium tetrapolyphosphate and 2.8 kg of edible sodium chloride were added to 28 kg of water and dissolved therein by heating to 60° C. 60 kg of the same fat and oil composition as the used in Example 1 was added thereto and the obtained mixture was emulsified with a homomixer (mfd. by Tokushu Kika Kogyo Co., Ltd.) at 15,000 rpm and at 60° C. for ten minutes to thereby give an oil-in-water type emulsified fat and oil composition.

EXAMPLE 3

10 kg of the phospholipid obtained in Example 2 and 290 kg of sodium caseinate were added to 900 kg of water and dissolved therin by heating to 60° C. Then 120 kg of hardened palm oil having a melting point of 45° C., 200 kg of palm oil, 400 kg of hardened soybean oil having a melting point of 36° C. and 80 kg of refined soybean oil were added thereto. The resulting mixture was emulsified by stirring with a propeller mixer at 200 rpm and at 60° C. for 15 minutes. The emulsion thus obtained was treated with a Contherm scraping UHT pasteurizer (mfd. by Alfa-Laval) at 130° C. for ten seconds. Then it was cooled to 40° C. in a cooler and homogenized under sterile conditions at a homogenizing pressure of 50 kg/cm$^2$. It was packed into a container under sterile conditions to thereby give an oil-in-water type emulsified fat and oil composition.

EXAMPLE 4

0.6 kg of the phospholipids obtained in Example 2, 12 kg of lactalbumin and 4.4 kg of edible sodium chloride were added to 43 kg of water and dissolved therein by heating to 60° C. Then 40 kg of the same fat composition as the one used in Example 3 was added thereto and the obtained mixture was emulsified with a homomixer (mfd. by Tokushu Kika Kogyo Co., Ltd.) at 15,000 rpm at 60° C. for ten minutes to thereby give an oil-in-water type emulsified fat and oil composition.

EXAMPLES 5 TO 8

The procedure of Example 1 was repeated except that the phospholipids were substituted with an emulsifier mixture comprising the phospholipids used in Example 1 and SY Gleaster MS 500 at a ratio (by weight, the same will apply hereinafter) of 5/5 (Example 5); an emulsifier mixture comprising the phospholipids used in Example 1 and SE-S 1670 at a ratio of 5/5 (Example 6); an emulsifier mixture comprising the phospholipids used in Example 1 and Emusol S-10-F at a ratio of 7/3 (Example 7); and an emulsifier mixture comprising the phospholipids used in Example 1 and Emulsy MS at a ratio of 7/3 (Example 8). Thus an oil-in-water type emulsified fat and oil composition was obtained in each case. The Emulsol S-10-F and Emulsy MS were dissolved in a fat and oil prior to the use.

The emulsifiers employed in the above Examples together with the phospholipids were as follows.

SY Gleaster MS-500: Mfd. by Sakamoto Yakuhin K. K., hexaglycerol monostearate, HLB: 11.6.

SE-S 1670: Mfd. by Mitsubishi Chemical Food Ltd., sucrose monosterate, HLB: 15.

Emusol S-10-F: Mfd. by Kao Corp., sorbitan monostearate, HLB: 4.7.

Emulsy MS: Mfd. by Riken Vitamin K. K., glycerol monostearate, HLB: 2.5.

EXAMPLES 9 TO 12

The procedure of Example 2 was repeated except that the phospholipids were substituted with an emulsifier mixture comprising the phospholipids used in Example 1 and SY Gleaster MS 500 at a ratio of 5/5 (Example 9); an emulsifier mixture comprising the phospholipids used in Example 1 and SE-S 1670 at a ratio of 5/5 (Example 10); an emulsifier mixture comprising the phospholipids used in Example 1 and Emusol S-10-F at a ratio of 7/3 (Example 11); and an emulsifier mixture comprising the phospholipids used in Example 1 and Emulsy MS at a ratio of 7/3 (Example 12). Thus an oil-in-water type emulsified fat and oil composition was obtained in each case. The Emusol S-10-F and Emulsy MS were dissolved in a fat and oil prior to the use.

The following table shows the contents of proteins, fats and oils, water, emulsifiers, edible sodium chloride and molten salts in the emulsified fat and oil compositions produced in Examples 1 to 12. Each product had a homogeneous and smooth texture and a consistency suitable for rolling-in at 5° to 20° C.

| Ex. No. | 1, 5 ~ 8 | 2, 9 ~ 12 | 3 | 4 |
| --- | --- | --- | --- | --- |
| Component | | | | |
| protein | 9.5 | 8 | 14.5 | 12 |
| fat and Oil | 60 | 60 | 40 | 40 |
| water | 30 | 28 | 45 | 43 |
| emulsifier | 0.5 | 0.6 | 0.5 | 0.6 |
| edible sodium chloride | 0 | 2.8 | 0 | 4.4 |
| molten Salt | 0 | 0.6 | 0 | 0 |

0.8 kg of the phospholipids of Example 2 and 0.1 kg of CMC were added to 16.5 kg of water and dissolved therein by heating to 60° C. Then 82.6 kg of the same fat and oil composition as the one used in Example 2 was added thereto and the obtained mixture was emulsified in the same manner as the one described in Example 2 to thereby give a rolled-in type emulsified fat and oil composition, which was used as a control. The rolling-in properties of the control product into a puff pastry prepared in the following manner was compared with those of the products of the present invention produced in Examples 1 to 12. As a result, each of the rolled-in type emulsified fat and oil composition of the present invention was comparable or even superior to the control one in flexibility, volume and texture. The following table shows the results of the comparison.

| Dough Composition | |
|---|---|
| hard flour | 50 parts |
| soft flour | 50 parts |
| edible sodium chloride | 0.5 part |
| water | 52 parts |
| shortening | 5 parts |

Preparation:

Dough mixing: at low rate for 2 min and at high rate for 5 min.

Amount of rolled-in type emulsified fat and oil composition to be folded in: 70% by weight based on flour Folding: into four, four times.

Molding: rolling to 2 mm in thickness followed by rapping.

Baking: at 200° C. for 15 min.

TABLE

| | Con-trol | \multicolumn{12}{c}{Examples} |
|---|---|---|---|---|---|---|---|---|---|---|---|---|---|
| | | 1 | 2 | 3 | 4 | 5 | 6 | 7 | 8 | 9 | 10 | 11 | 12 |
| ① | ◉ | ◉ | ◉ | ◉ | ◉ | ◉ | ◉ | ◉ | ◉ | ◉ | ◉ | ◉ | ◉ |
| ② | ◉ | ◉ | ◉ | ◉ | ◉ | ◉ | ◉ | ◉ | ◉ | ◉ | ◉ | ◉ | ◉ |
| ③ | ◉ | ◉ | ◉ | ◉ | ◉ | ◉ | ◉ | ◉ | ◉ | ◉ | ◉ | ◉ | ◉ |

Note
① Spreadability
② Floating
③ Texture

COMPARATIVE EXAMPLE 1

0.5 kg of the phospholipids of Example 2 and 1.5 kg of sodium caseinate were added to 70 kg of water and dissolved therein by heating to 60° C. 28 kg of the same fat composition as the one used in Example 2 was added thereto and the obtained mixture was emulsified in the same manner as the one described in Example 2 to thereby give an oil-in-water type emulsified composition. The obtained product was homogeneous and smooth but flowable and could not be rolled in.

COMPARATIVE EXAMPLE 2

0.5 kg of the phospholipids of Example 2 and 21.5 kg of sodium caseinate were added to 48 kg of water and dissolved therein by heating to 60° C. 30 kg of the same fat and oil composition as the one used in Example 2 was added thereto and the obtained mixture was tentatively emulsified in the same manner as the one described in Example 2. However no emulsion could be formed.

COMPARATIVE EXAMPLE 3

0.8 kg of the phospholipids pf Example 2 and 7.2 kg of sodium caseinate were added to 17 kg of water and dissolved therein by heating to 60° C. 75 kg of the same fat and oil composition as the one used in Example 2 was added thereto and the obtained mixture was tentatively emulsified in the same manner as the one described in Example 2. However no emulsion could be formed.

COMPARATIVE EXAMPLE 4

0.8 kg of the phospholipids of Example 2 and 1.5 kg of sodium caseinate were added to 16.5 kg of water and dissolved therein by heating to 60° C. 81.2 kg of the same fat and oil composition as the one used in Example 2 was added thereto and the obtained mixture was emulsified in the same manner as the one described in Example 2 to thereby give an oil-in-water type emulsified fat and oil composition. The obtained product containing a large amount of fat and oil showed rolling-in properties nearly comparable to those of the above control one. Thus the addition of the protein exerted no effect.

COMPARATIVE EXAMPLE 5

The procedure of Example 1 was repeated except that no phospholipid was added. As a result, no emulsion could be formed.

COMPARATIVE EXAMPLES 6 TO 9

The procedure of Example 1 was repeated except that the phospholipids were substituted with SY Gleaster MS500 (Comparative Example 6), SE-S 1670 (Comparative Example 7), Emusol S-10-F (Comparative Example 8), and Emulsy MS (Comparative Example 9). As a result, no emulsion could be formed in each case.

COMPARATIVE EXAMPLES 10 TO 13

The procedure of Example 2 was repeated except that the phospholipids were substituted with SY Gleaster MS500 (Comparative Example 10), SE-S 1670 (Comparative Example 11), Emusol S-10-F (Comparative Example 12), and Emulsy MS (Comparative Example 13). As a result, no emulsion could be formed in each case.

What is claimed is:

1. A process for producing a rolled-in type emulsified composition by emulsifying 2 to 20% by weight of protein, 30 to 75% by weight of fat and oil, and 18 to 65% by weight of water in an oil-in-water emulsion wherein 0.1 to 5% by weight, based on the weight of fat and oil, of a phospholipid, comprised of at least 40% by weight of mono acyl glycero phospholipid, is added as at least one emulsifier component.

2. The process of claim 1 wherein 7 to 15% by weight of protein, 40 to 60% by weight of fat and oil, and 25 to 50% by weight of water are used.

3. The process of claim 1 wherein said oil-in-water emulsion is heated to 110 to 150 degrees C. for two seconds to four minutes.

4. The process of claim 3 wherein said oil-in-water emulsion is homogenized under sterile conditions after heating the same.

5. The process of claim 1 wherein 6 to 30% by weight, based on the water content of said oil-in-water emulsion, of edible sodium chloride is added.

6. The process of claim 1 wherein 0.5 to 15% by weight, based on the protein content, of molten salt is added.

7. The process of claim 6 wherein said molten salt is selected from the group consisting of sodium citrate, sodium tetrapolyphosphate and sodium tripolyphosphate.

8. The process of claim 1 wherein said protein is one treated with protease.

9. The process of claim 1 wherein said phospholipid substantially comprises lyso phosphatidylcholine.

10. The process of claim 1 wherein said phospholipid further includes one or more fatty acid esters selected from the group consisting of polyglycerol fatty acid esters, sucrose fatty acid esters and sorbitol fatty acid esters in a phospholipid to fatty acid ester weight ratio of 30:70 to 100:0.

11. The process of claim 1 wherein said phospholipid further includes glycerol fatty acid monoesters in a phospholipid to fatty acid monoester weight ratio of 50:50 to 100:0.

12. The process of claim 9, further comprising a di acyl phospholipid.

13. The process of claim 2 wherein said oil-in-water emulsion is heated to 110 to 150 degrees C. for two seconds to four minutes.

14. The process of claim 13 wherein said oil-in-water emulsion is homogenized under sterile conditions after heating the same.

15. The process of claim 14 wherein 6 to 30% by weight, based on the water content of said oil-in-water emulsion, of edible sodium chloride is added.

16. The process of claim 14 wherein 0.5 to 15% by weight, based on the protein content, of molten salt is added.

17. The process of claim 16 wherein said molten salt is selected from the group consisting of sodium citrate, sodium tetrapolyphosphate and sodium tripolyphosphate.

18. The process of claim 15 wherein said protein is one treated with protease.

19. The process of claim 15 wherein said phospholipid substantially comprises lyso phosphatidylcholine.

20. The process of claim 19, further comprising di acyl phospholipid.

21. The process of claim 15 wherein said phospholipid further includes one or more fatty acid esters selected from the group consisting of polyglycerol fatty acid esters, sucrose fatty acid esters, and sorbitol fatty acid esters in a phospholipid to fatty acid ester weight ratio of 30:70 to 100:0.

22. The process of claim 15 wherein said phospholipid further includes glycerol fatty acid monoesters in a phospholipid to fatty acid monoester weight ratio of 50:50 to 100:0.

* * * * *